(12) United States Patent
Sundqvist et al.

(10) Patent No.: US 7,885,286 B2
(45) Date of Patent: Feb. 8, 2011

(54) METHOD AND ARRANGEMENTS IN AN IP NETWORK

(75) Inventors: Jim Sundqvist, Luleå (SE); Erik Lundgren, Luleå (SE)

(73) Assignee: NetSocket, Inc., Plano, TX (US)

( * ) Notice: Subject to any disclaimer, the term of this patent is extended or adjusted under 35 U.S.C. 154(b) by 1446 days.

(21) Appl. No.: 11/315,293

(22) Filed: Dec. 23, 2005

(65) Prior Publication Data

US 2007/0147344 A1    Jun. 28, 2007

(51) Int. Cl.
*H04J 3/26* (2006.01)
(52) U.S. Cl. .................. 370/432; 370/230; 370/477
(58) Field of Classification Search .................. 370/230, 370/432, 477
See application file for complete search history.

(56) References Cited

U.S. PATENT DOCUMENTS

| | | | |
|---|---|---|---|
| 6,714,515 | B1 | 3/2004 | Marchand |
| 2002/0114331 | A1 | 8/2002 | Cheung et al. |
| 2002/0143852 | A1* | 10/2002 | Guo et al. ................ 709/201 |
| 2003/0187986 | A1 | 10/2003 | Sundqvist et al. |
| 2004/0122975 | A1* | 6/2004 | Lennestal et al. .......... 709/245 |
| 2005/0081244 | A1 | 4/2005 | Barrett et al. |
| 2005/0094643 | A1* | 5/2005 | Wang et al. ............ 370/395.4 |
| 2005/0157742 | A1 | 7/2005 | Chen et al. |
| 2005/0190781 | A1* | 9/2005 | Green et al. ................ 370/432 |
| 2007/0081459 | A1* | 4/2007 | Segel et al. ................ 370/230 |
| 2007/0107026 | A1* | 5/2007 | Sherer et al. ................. 725/97 |

FOREIGN PATENT DOCUMENTS

| | | |
|---|---|---|
| EP | 1 523 190 A1 | 4/2005 |
| WO | WO 0256564 A1 | 7/2002 |

OTHER PUBLICATIONS

Ueno et al., "Special Feature: Multicast Technology for Broadcast-type Data Delivery Services," NTT Technical Review, vol. 3, No. 11, Nov. 2005, p. 6, col. 2, line 10, through p. 7, col. 2, line 26.

* cited by examiner

*Primary Examiner*—Jason E Mattis
(74) *Attorney, Agent, or Firm*—Slater & Matsil, L.L.P.

(57) ABSTRACT

An IP network includes a network resource manager having a resource utilization map adapted to manage network resources in an IP network and an application framework having elements for receiving a request for a multicast distribution from a client in the IP network, and elements for requesting network resources from a network resource manager for a Media Quick Start, to start the requested multicast distribution. Further, the network resource manager includes elements for providing the application framework with feedback information relating to network resource availability from the network resource manager, and the application framework includes elements for receiving the feedback information and elements for allowing the Media Quick start or to use another behavior to start the requested multicast distribution based on the received feedback information.

12 Claims, 4 Drawing Sheets

METHOD AND ARRANGEMENTS IN AN IP NETWORK

FIELD OF THE INVENTION

The present invention relates to methods and arrangements in an IP network, in particular for initiating a multicast media distribution.

BACKGROUND OF THE INVENTION

The Internet and Internet Protocol (IP) networks have had a tremendous growth over the past decades. The simplicity and flexibility are the major advantages with the IP technology compared to traditional telecommunication technologies such as circuit-switched networking and ATM. The IP technology is packet-based and has been designed to keep the network infrastructure simple and open to support a variety of applications, while the intelligence have been moved to the clients connected to the networks. The network infrastructure has one major task, which is to forward data from a sending client to at least one receiving client. The sending client has the major task to pack the information it would like to send to the receiving client(s) and address it accordingly so it can be forwarded towards the receiving client(s) by the network infrastructure. The receiving client(s) has its major task as putting together the received data to reproduce the information that was sent by the sender. A receiving client may for example be a set-top-box (STB) or a PC equipped with an application capable of receiving media streams whereas a sending client is typically an application framework or integrated content portal/content server. The network infrastructure comprised of e.g. routers, switches, Broadband Remote Access Servers (BRAS), access nodes or other network elements has no knowledge about the information that is being sent from the sending client to the receiving client(s), thereby it can be seen as simple. Among the advantages with having this approach for the network infrastructure can be mentioned low cost and openness. Since the network infrastructure does not know what the data is that is being sent, it is up to the sending client and receiving client(s) to develop different applications for different purposes.

This design has made it possible to run so called multi-service networks, i.e. a wide variety of applications can run over the same network infrastructure. Initially, applications were text messages (e-mail) and non real-time critical file transfers. Today the Internet is being used for a huge variety of applications including real-time applications such as IP telephony and video on demand over broadband networks. Offerings from the broadband operators are referred to as Triple play, where the customer gets telephony, video and data over the same broadband connection. Media content distribution is achieved by combining an element of control sometimes referred to as session control or application framework with an element of distribution, content server or servers. The application framework handles the session control interaction between the sending clients and receiving clients and mediates between clients and content servers. The content server and application framework may be integrated or separated both logically and geographically.

For applications such as telephony, video and broadcast TV the source information must be adapted to be able to be transmitted over IP networks. Continuous source information is segmented into appropriate information blocks (e.g. speech frames and video frames) and for each block the information is encoded by a source encoder, packet into an IP packet and then sent to the receiving client(s) where these decode the information to reproduce the original information.

Encoding information in each information block can be made independently of previous and following information blocks. However, information between current information block and previous and/or following information block are usually more or less correlated. By using this property one can reduce the amount of data needed to encode the source information through the use of predictive or differential coding.

Today, many of the compression schemes that exist for media encoding relies on predictive coding whereby the difference between the reproduced signal and its prediction is transmitted instead of transmitting the reproduction, frame by frame. A typical example is MPEG video (as described for example in ISO IEC 13818-2 Information technology—Generic coding of moving pictures and associated audio information—Part 2: Video ISO/IEC JTC 1/SC 29 N 635) which is incorporated herein as a reference. The transmitted frame types are divided in three different subcategories, I-frames, P-frames and B-frames which are illustrated in FIG. 1.

The I-frame, referred to as the key frame, is a self-contained item of data i.e. it has no references to any other frames and is as such a directly reproducible and represents a complete image while the P-frames are encoded representations of the difference between the contents of the current frame and the previous I- or P-frame. The B-frames are the encoded representations of the bidirectional difference between the previous I- or P-frame and the next I- or P-frame whichever is closest.

Predictive/differentially coded media suffers from the drawback that it is required to wait for the next key frame before reproduction (play out) can begin since the key frame is the only frame type that can be reproduced without any other information. The decoder typically buffers or discards data until a key frame is received after which reproduction can begin. Depending on the level of compression and compression method used, this can take anywhere from a few milliseconds up to several seconds.

For distributing media streams e.g. video in IP networks, there are currently basically two different methods called unicast and multicast.

Unicast describes the method whereby each client receives its own copy of the media stream and the media stream can not be shared between different clients. Even though one server can serve many clients, the media streams are separate, i.e. one instance per receiver. This method is typically used to provide services such as video-on-demand (VoD) where a user controlling the client may want to start a media stream at any instant and where the user may want to fast-forward/rewind or pause the stream at any time. The advantage of using unicast is that all clients may have their own copy of the media stream. The disadvantage of unicast is that for each new instance of the same media stream, additional bandwidth is required, leading to scalability problems for large deployments.

Multicast, in contrast to unicast, describes a method whereby a plurality of clients can receive a media stream simultaneously, i.e. one sender transmits the same media flow to the plurality of receiving clients. The plurality of the receiving clients constitutes a multicast group. That implies that multicast is a very resource efficient method and is typically used to provide live broadcasts to one or more recipient at a time.

Thus, providing bandwidth efficient live broadcast media streams in IP networks requires multicast to avoid having to duplicate the same information for all clients currently sharing the same media flow.

For unicast distribution of differentially coded media, the sender can guarantee that the first transmitted item of data is a key frame and as such suitable for immediate reproduction. If differentially coded media is distributed using multicast, the receiver can get no guarantees about what type of frame it will first encounter since the receiver in effect typically subscribes (latches on) to an ongoing media stream and the first received frame may be of any type transmitted. If the first received frame is not a key frame, it references a frame already sent but since this non key frame was the first frame encountered by the receiver, the reference has not been received and the receiver must wait for the next transmitted key frame which will cause a delay of the reproduction.

As stated above, the bandwidth efficient multicast media distribution is required for live broadcast media streams in IP networks. However, media such as video are usually differentially coded which implies that multicast causes that the receiver must wait for a key frame before it can reproduce the information. This could be perceived by the user as a delay. It would therefore be desired to utilize the property of the unicast distribution to immediately start the reproduction of the unicast distribution for differentially coded media.

To combine the bandwidth efficiency of the multicast media distribution with the ability to immediately start the reproduction of the unicast distribution for differentially coded media, both distribution methods (unicast and multicast) can be used in combination. I.e. a unicast media distribution is initiated and a multicast distribution are also initiated if there is no existing multicast stream to synchronize with. The unicast distribution is ongoing until the initiated multicast distribution is ready to start or when synchronization with an already existing multicast stream is completed, i.e. when the key frame is received. Thus, the media receiver is first served a unicast stream and the receiver can initiate play out from the unicast stream immediately while waiting for the multicast transmission to be able to start if the multicast transmission is not available or while waiting for synchronizing with an already existing multicast transmission. When the multicast transmission is initiated, data is buffered until enough information is available, i.e. at least when a next key frame is received, and then the client switches form reproducing data from the unicast stream to reproducing data from the multicast stream. Additional buffering may also be desired. The unicast stream may then be dropped when the multicast stream itself can continue to reproduce the media. Thus, the advantages of both the unicast distribution and the multicast distribution can be achieved. This procedure also enables very fast media changes such as channel changes. This procedure is referred to as "Media Quick Start" in this description.

Since unicast media distribution is less bandwidth efficient than multicast distribution, a plurality of unicast media distributions requires much more resources than one multicast distribution. Hence, problems occur when the media server gets a request that would result in Media Quick Start unicast data from a client in an already congested network or a network that will experience congestion if the resulting unicast traffic should be admitted into the network. If the request is denied, the media distribution can not start, even if client would have been able to receive media from the multicast distribution. If the request is granted, the network will be congested to the point where the admitted traffic can affect already existing traffic admitted before the congestion occurred thus adversely affecting the Quality of Experience for all users of the network in question. It is therefore desired to a achieve an improved solution for a Media Quick Start such that additional data transmission in an already congested network is avoided. Without this improvement, service for other users will be disrupted by the additional data.

SUMMARY OF THE INVENTION

As stated above, the multicast distributed media streams (i.e. the broadcast or media-on-demand streams) from e.g. an IPTV solution are usually encoded by state-of-the-art coding techniques using predictive or differential coding. Predictive and differential coding methods both need a reference frame to start from. That implies that the receiver has to wait for the reference frame until it can reproduce and play out the received data which could be perceived by the user as a delay. For e.g. an IPTV solution, it is possible to start the media requiring multicast distribution by using a Media Quick Start. That results in that the receiver can start play out immediately thanks to the unicast distribution that does not suffer from the delay as the multicast distribution. However, this requires that an additional unicast distribution is initiated in addition to the requested multicast distribution, which may result in disruption of services for other users if the current network is congested.

The present invention solves that by providing feedback information to the application framework e.g. the IPTV server, regarding the resource availability between the sender and the receiver. Based on this feedback information, the application framework can use the Media Quick Start if enough resources are available, otherwise the application framework can select another more suitable start method that requires less resources.

According to embodiments of the present invention said another behavior is, to deny, or to temporarily deny the requested Media Quick Start.

According to a further embodiment said another behavior is to use the feedback information provided by the resource manager to signal to the client that a Media Quick Start unicast stream for the requested multicast distribution is not available due to resource shortage in the IP network but the client is still allowed to subscribe to the multicast distribution.

An advantage with the present invention is that the network operator is able to get better control of what is happening of the value added services that the network operator enables through the network.

DESCRIPTION OF THE INVENTION

Figure 1:
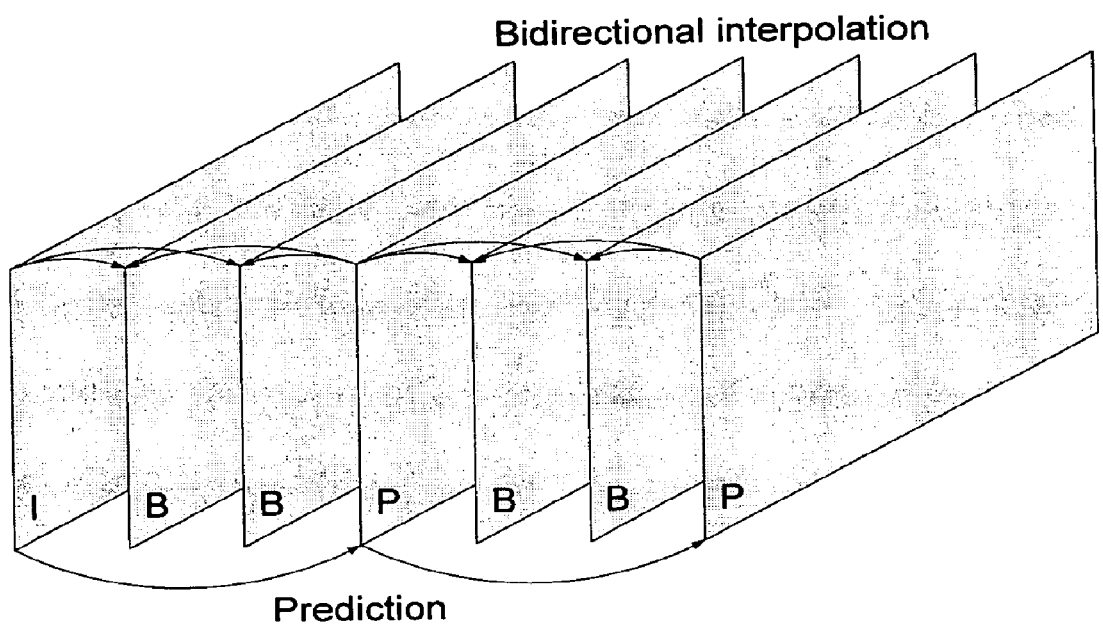
FIG. 1 illustrates a typical MPEG stream according to prior art.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is applicable to the situation when a client requests a distribution of a media stream that requires multicast distribution and when the application framework requests resources for a Media Quick Start to start the media distribution.

To start a multicast media distribution by using a combined unicast and multicast media distribution is as stated above referred to as a Media Quick Start. Thus, a Media Quick Start implies that both a unicast media distribution and also a multicast media distribution are initiated if there is no existing multicast media distribution. If there is an existing multicast media distribution, a unicast distribution is initiated but no further multicast distribution but the receiver starts a synchronization procedure with that existing multicast stream. The synchronization procedure is completed when a key frame is received or when the receiving clients determines that the synchronization procedure is completed.

A media stream in this context is a packet data flow comprising audio, video, other media or any combination thereof.

The above mentioned problem with the use of the Media Quick Start is solved by providing feedback information regarding the resource situation in the network between the sender and the receiver to the application framework (e.g. an IPTV server). Based on this feedback information, the application framework can allow Media Quick Start or select another appropriate behaviour to start the media distribution. I.e. if there are enough available resources in the network between the sender and the receiver, Media Quick Start is allowed, otherwise another start behaviour is selected that requires less resources.

The resource situation can be analysed by a network resource manager. The network resource manager is a functional entity in the network that keeps and maintains an updated map of the resources in the network. The resources in the map typically consist of devices and interconnecting elements in the network. Examples of network resources include routers, Digital Subscriber Line Access Modules (DSLAMs), switches, physical wires, optical fiber and many other types of elements. A network resource may also be a partition of a device, network or interconnecting element (logical link).

The network resource manager is described in many different forums under many different names. In some forums, it is referred to as Bandwidth Manager or Bandwidth Broker. ETSI/TISPAN refers to the function as Resource Admission Control Subsystem (RACS). The 3GPP initiative calls it Policy Decision Function (PDF) and ITU denotes it Resource and Admission Control Function (RACF) but the common denominator is that it is an entity in the network that keeps track of the network resources and network resource utilization and/or performs admission control. This entity is in this description referred to as a network resource manager.

The network resource manager supports application and service frameworks by providing information about the network resources in which the application and service frameworks act. For example, a video server may, when it receives a request for data from a client, reserve resources with the network resource manager for transmission of the requested data. The network resource manager will then add the reserved resources to the current network utilization, thus keeping track of how much of the available resources in the network are in use.

A topologically correct view of the network or contention points is essential for the network resource manager to be able to determine when network resources are exhausted in any parts of the managed network. The topology information can be acquired through interaction with Operation Support Systems (OSSs) and/or active/passive probing of network devices.

Figure 2:
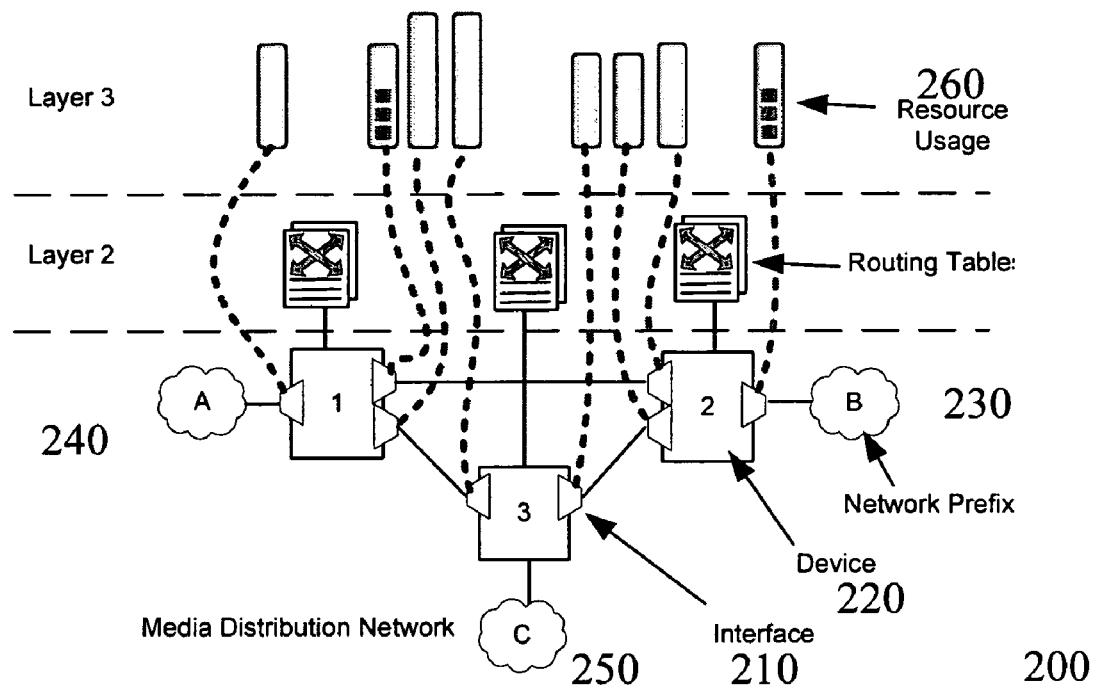
FIG. 2 shows a schematic example of a network resource map according to prior art.

Turning now to FIG. 2 showing a schematic example of a network resource map 200 arranged to indicate the resource situation 260, i.e. the usage of the network. Interfaces 210, devices 220 and subnets 230, 240 in the network are represented as resources in the map and provisioned with its physical or logical (partitioned) capacity. Capacity is usually measured in bandwidth and logical capacity concerns a provisioned value that can be lower than its physical value. This can be exemplified by the scenario where the network architecture partitions a 100 Mbit/s connection in four connections, each having the capacity of 25 Mbit/s. The partitioning can be done in routers and switches and may be modelled by the resource manager. Furthermore, consider the following example of application/network resource manager interaction: When a media server in the media distribution network gets a media request from a client, it reserves bandwidth by means of the network resource manager that, due to its topology knowledge can track the impact of the additional traffic, that a transmission of the requested media would result in, on all resources or contention points between the sender and receiver. It should be noted that the network resource manager may actively configure a network element or just keep track of reserved resources. However, in the context of the present invention it is enough if the resource manager keeps track of reserved resources, and whether the resource manager actively configure the network elements is beyond the scope of the invention. If the reservation fails due to excessive resource usage anywhere between sender and receiver of the media stream, the request is denied. Thus the congested networks are protected from additional data (i.e. the media request) that would otherwise affect the Quality of Experience for existing sessions.

By participating in multicast control protocols such as Internet Group Management Protocol (IGMP) signalling or acting as an intermediate (proxy) in IGMP snooping or by interaction with the application framework, the network resource manager can be aware of and in some cases even limit the propagation of the multicast information in the network. This allows the network resource manager to keep track of multicast flows in the network which also is needed to keep a correct view of the network resource situation since multicast flows also consume network resources.

Thus the present invention uses a topology-aware network resource manager keeping a resource map of all traffic in the network. The application framework such as video server farm, or an IPTV server, requests resources in the network for a Media Quick Start from the resource manager prior to sending any additional media streams into the network. The Media Quick Start request implies resources for a unicast distribution and also for resources for the multicast distribution if there is no existing multicast distribution. However, another approach is to specifically partitioning resources for multicast media distribution and just reserve resources for the unicast distribution. Based on the network resource utilization, the network resource manager provides feedback information to the application framework whether or not the requested media stream distribution can be accommodated by all networks between the media distribution site and the receiver. The application framework can then based on the received feedback information select an appropriate way to start distribution of the requested media.

If there are enough resources available in the network according to the received feedback information from the network resource manager, the application framework allows the Media Quick Start, otherwise the application framework selects another behaviour.

Such another behaviour may involve that the application framework denies Media Quick Starts that would otherwise cause congestion in networks between the sender and receiver. Doing so would avoid affecting the Quality of Experience for all users in the congested networks.

According to one embodiment of the present invention, provided the multicast version of the requested media stream is already available "close" to the receiver, the application framework opts to just temporarily deny the requested Media Quick Start. The term "close" implies that the current multicast group already is available in the closest router or switch and does not need to be requested further away in the network.

According to a further embodiment, the application framework comprises means for using the feedback provided by the resource manager to signal to the client that a Media Quick Start unicast stream for the requested media is not available due to resource shortage in the network but the client may still be allowed to subscribe to the multicast version of the media. The client may then subscribe to the multicast stream and, once it receives a key frame (or an appropriate position in the stream), start reproducing the media. In this case, the client will not receive the Media Quick Start feature but any already congested or near congested networks between the sender and receiver will be spared from an additional unicast media stream.

The resource utilization map may take best effort traffic into account. Depending on how the network is provisioned by the network operator, the best-effort traffic may be separated from other non best-effort traffic by partitioning or all traffic both the best-effort and the non best-effort may be included in the same class. If there is a partitioning between the best-effort and the non best-effort traffic, the best-effort traffic will not affect the other time critical traffic such as video and telephony. In contrast, if all traffic belongs to the same class and if all traffic is allowed to use all the available resources it is not possible to guarantee a quality of service since the best effort traffic may affect the traffic any time. However, the resource utilization map may nevertheless take best-effort traffic into account by traffic measurement and/or provisioning to ensure that best effort traffic can not affect the resource situation for value-added services, e.g. the requested media stream.

Figure 3:
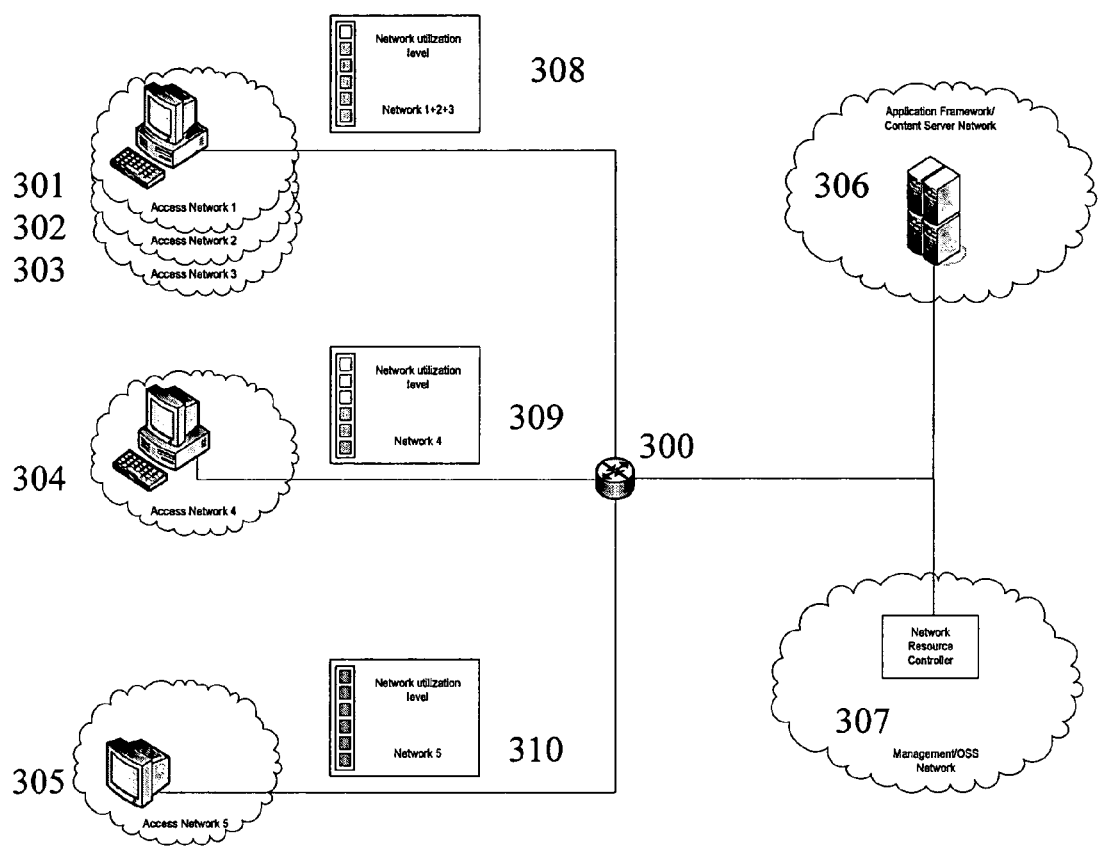
FIG. 3 shows schematically a network with a network resource manager and an application framework according to the present invention.

Turning now to FIG. 3, showing a scenario where the present invention is applicable. FIG. 3 illustrates an access device 300 such as a multiservice edge router or BRAS having five connected access networks 310-305. The networks 301-303 are connected to the same network segment while the network 304 and the network 305 are connected straight to the access device 300. An application framework in this case combined with a content server network is further connected to the access device 300 and a management network 307 comprising a network resource manager is also connected to the access device 300. In the scenario of FIG. 3, the networks 301-304 have enough resources for a Media Quick Start, which is illustrated by the empty squares of the network resource utilization maps 308-309 provided by the network resource manager 307. The map 308 shows the resource utilization for the networks 301-303, the map 309 shows the resource utilization for the network 304 and the map 310 shows the resource utilization for the network 305. Thus the squares of the maps 308-310 of the resource manager 307 illustrates in this description the resource utilization map, which in reality is an internal data structure preferably.

The access network 305 is however full, which means that the resource manager will not allow a Media Quick Start, e.g. in the case when a user in network 305 wants to change channel and the application framework tries to reserve resources for a Media Quick Start. The feedback information according to the present invention from the resource manager to the application framework is transmitted by means of request/response messages. The application framework 306 sends a request to the network resource manager 307 for resources for a Media Quick Start. The request comprises the address of the client (e.g. located in the access network 301) and the address of the content server and the request is made each time a client requests media. The Network resource manager 307 analyzes the network resource utilization map and determines if there are enough available resources between the client and the content server and sends then feedback information regarding the resource availability to the application framework such that the application framework can allow the Media Quick Start or select another appropriate behaviour to start the media distribution based on the feedback information.

Thus the present invention relates to an application framework comprising means for receiving a request for a media distribution that requires a multicast distribution from a client in said IP network, means for requesting network resources from a network resource manager for a Media Quick Start, to start the requested media distribution, means for receiving feedback information relating to network resource availability from the network resource manager, and means for allowing the Media Quick start or to use another behavior to start the requested media distribution based on the received feedback information.

Further, the present invention also relates to a network resource manager comprising a resource utilization map adapted to managing network resources in an IP network. The network resource manager comprises means for receiving a resource request from an application framework to start a media distribution by using a media quick start and means for, in response to said request, providing feedback information relating to resource availability such that the application framework can select to allow the Media Quick start or to use another behavior to start the media multicast distribution based on the received feedback information.

Further the present invention relates to a system comprising the application framework and the network resource manager.

The present invention also relates to methods. The method of the application framework according to the present invention is illustrated in the flowchart of FIG. 4a and comprises the steps of:

401. Receive a request for a media distribution that requires multicast distribution from a client in said IP network.
402. Request network resources from a network resource manager for a Media Quick Start, to start the requested media distribution.
403. Receive feedback information relating to network resource availability from the network resource manager.
404. Allow the Media Quick start or use another behavior to start the requested media distribution based on the received feedback information.

Figure 4B:
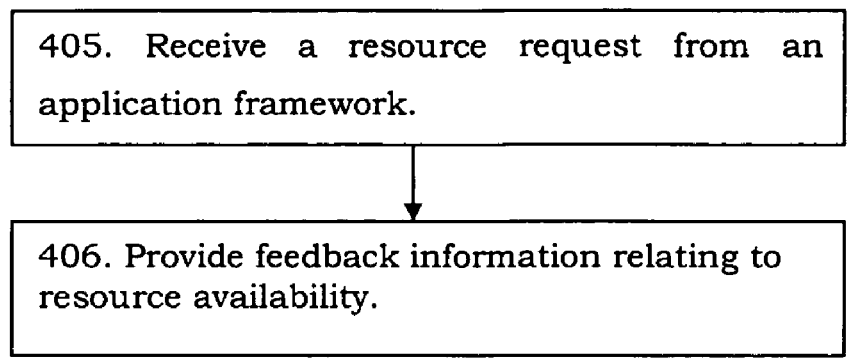
FIGS. 4a and 4b shows a flowchart of the methods according to the present invention.
Figure 4A:
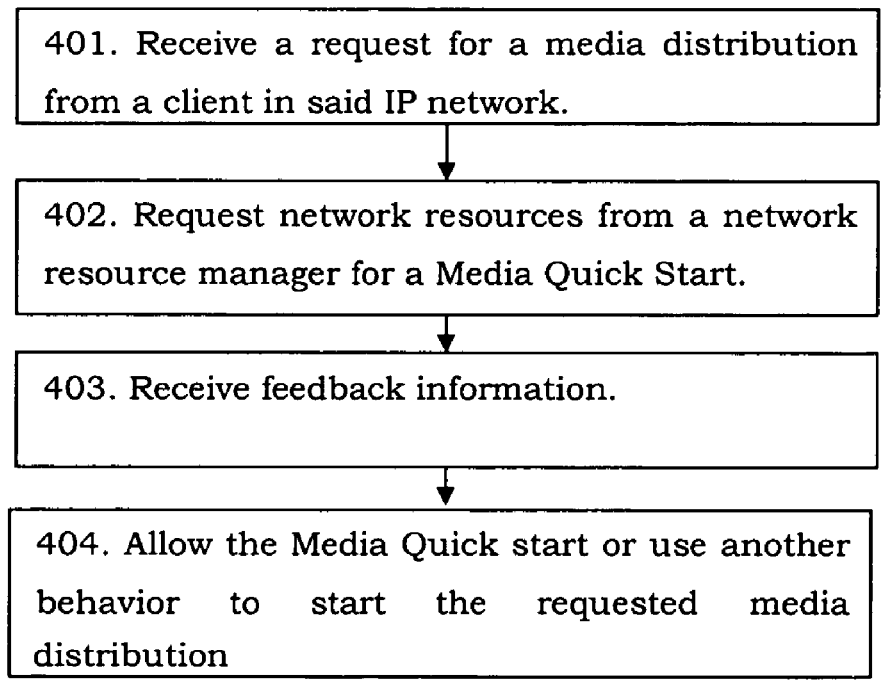

The method of the network resource manager is illustrated in the flowchart of FIG. 4b and comprises the steps of:

405. Receive a resource request from an application framework to start a media distribution by using a media quick start. In response to said request:

406. Provide feedback information relating to resource availability such that the application framework can select to allow the Media Quick start or to use another behavior based to start the media multicast distribution on the received feedback information.

The methods are preferably implemented by computer program products. The computer program products are directly loadable into the internal memory of a computer within a router or server in the IP network, comprising the software code portions for performing the steps of the methods. The computer program products may also be stored on a computer usable medium, comprising readable program for causing a computer, within a router or server in the IP network, to control execution of the steps of the methods.

However, the methods may also be implemented by Application-Specific Integrated Circuits (ASICs) which are chips designed for the particular methods according to the invention.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. An application framework connectable to an IP network, the application framework comprises means for receiving a request for a media distribution requiring a multicast distribution from a client in said IP network, means for requesting network resources from a network resource manager for a Media Quick Start, to start the multicast distribution, means for receiving feedback information relating to network resource availability from the network resource manager, and means for allowing the Media Quick start or to use another behavior to start the media distribution based on the received feedback information, wherein said another behavior is to use the feedback information provided by the resource manager to signal to the client that a Media Quick Start unicast stream for the requested media distribution is not available due to resource shortage in the IP network but the client is still allowed to subscribe to the multicast distribution.

2. The application framework according to claim 1, wherein said another behavior further includes to temporarily deny the requested Media Quick Start.

3. The application framework according to claim 1, wherein said another behavior further includes to deny the use of Media Quick Start to start the media distribution.

4. A system comprises a network resource manager comprising a resource utilization map adapted to manage network resources in an IP network, an application framework comprising means for receiving a request for a media distribution requiring a multicast distribution from a client in said IP network, and means for requesting network resources from a network resource manager for a Media Quick Start, to start the requested media distribution, the network resource manager comprises means for providing the application framework with feedback information relating to network resource availability from the network resource manager, and the application framework comprises means for receiving said feedback information and means for allowing the Media Quick start or to use another behavior to start the requested media distribution based on the received feedback information, wherein said another behavior is to use the feedback information provided by the network resource manager to signal to a client that a Media Quick Start unicast stream for the requested media is not available due to resource shortage in the IP network but the client is still allowed to subscribe to a multicast version of the media.

5. The system according to claim 4, wherein said another behavior further includes to temporarily deny the Media Quick Start.

6. The system according to claim 4, wherein said another behavior further includes to deny the Media Quick Start.

7. A method for an application framework connectable to an IP network, wherein the method comprises the steps of:
receiving a request for a media distribution requiring a multicast distribution from a client in said IP network,
requesting network resources from a network resource manager for a Media Quick Start, to start the requested media distribution,
receiving feedback information relating to network resource availability from the network resource manager, and
allowing the Media Quick start or using another behavior to start the requested media distribution based on the received feedback information, wherein said another behavior is to use the feedback information provided by the network resource manager to signal to the client that a Media Quick Start unicast stream for the requested media distribution is not available due to resource shortage in the IP network but the client is still allowed to subscribe to the multicast distribution.

8. The method according to claim 7, wherein said another behavior further includes to temporarily deny the requested Media Quick Start.

9. The method according to claim 7, wherein said another behavior further includes to deny the requested Media Quick Start.

10. A computer program product embodied on a non-transitory computer-readable medium comprising software code portions for performing the steps of claim 7.

11. A computer program product stored on a computer usable medium, comprising readable program for causing a computer, within an application framework in an IP network, to control an execution of the steps of claim 7.

12. An Application-Specific Integrated Circuit for starting a multicast media distribution in an IP network, wherein the Integrated Circuit comprises means for receiving a request for a media distribution requiring a multicast distribution from a client in said IP network, means for requesting network resources from a network resource manager for a Media Quick Start, to start the requested media distribution, means for receiving feedback information relating to network resource availability from the network resource manager, and means for allowing the Media Quick start or to use another behavior to start the requested media distribution based on the received feedback information, wherein said another behavior is to use the feedback information provided by the resource manager to signal to the client that a Media Quick Start unicast stream for the requested media distribution is not available due to resource shortage in the IP network but the client is still allowed to subscribe to the multicast distribution.

* * * * *